United States Patent [19]
Fatehi

[11] Patent Number: 6,122,095
[45] Date of Patent: Sep. 19, 2000

[54] WAVELENGTH-SELECTIVE AND LOSS-LESS OPTICAL ADD/DROP MULTIPLEXER

[75] Inventor: Mohammad Taghi Fatehi, Middletown, N.J.

[73] Assignee: Lucent Technologies Inc., Murray Hill, N.J.

[21] Appl. No.: 08/920,391

[22] Filed: Aug. 29, 1997

[51] Int. Cl.[7] .............................. H04J 14/02; G02B 6/28; H01S 3/00

[52] U.S. Cl. ......................... 359/337; 359/127; 359/130; 359/349

[58] Field of Search .................................. 359/124, 127, 359/130, 341, 160, 349, 337

[56] References Cited

U.S. PATENT DOCUMENTS

| | | | |
|---|---|---|---|
| 5,058,974 | 10/1991 | Mollenauer | 359/341 |
| 5,218,608 | 6/1993 | Aoki | 372/6 |
| 5,579,143 | 11/1996 | Huber | 359/130 |
| 5,600,473 | 2/1997 | Huber | 359/179 |
| 5,633,741 | 5/1997 | Giles | 359/124 |
| 5,742,416 | 4/1998 | Mizrahi | 359/134 |
| 5,778,118 | 7/1998 | Sridhar | 359/114 |

OTHER PUBLICATIONS

"Low–Loss Add/Drop Multiplexers for WDM Lightwave Networks" by C. R. Giles of AT&T Bell Laboratories, Crawford Hill Laboratory, Holmdel, NJ 07733–0400, and V.Mizrahi of AT&T Bell Laboratories, Murray Hill, NJ 07974–0636, IOOC–95, pp. 66–68.

"Repeatered Bidirectional 10 Gb/s–240 km Fiber Transmission Experiment" by J.–M. P. Delavaux, C. R. Giles, S. W. Granlund, and C. D. Chen; Lucent Technologies Inc., Bell Laboratories, Breinigsville, Pennsylvania 18031–9351 and Lucent Technologies Inc., Bell Laboratories, Crawford Hill, New Jersey 07733–0400; Optical Fiber Technology 2, pp. 351–357 (1996), Article No. 0040.

"Long–period fiber–grating–based gain equalizers" by Ashish M. Vengsarkar, J. Renee Pedrazzani, Justin B. Judkins, and Paul J. Lemaire of AT&T Bell Laboratories, 600 Mountain Avenue, Murray Hill, New Jersey 07974 and Neal S. Bergano and Carl R. Davidson of AT&T Bell Laboratories, 101 Crawfords Corner Road, Holmdel, New Jersey 07733; Optics Letters, vol. 21, No. 5, Mar. 1, 1996; pp. 336–338.

"Strong Bragg Gratings in Non Sensitized Low Loss Planar Waveguides as Building Blocks for WDM Network Components" by Jorg Hubner, Jean–Marc Jouanno, Jens Engholm Pedersen, Rasmus Kromann, Thomas Feuchter and Martin Kristensen; Mikroelektronik Centret, Technical University of Denmark, DK–2800 Lyngby, Denmark and NKT Research Center A/S, Sognevej 11, DK–2065 Brondby, Denmark, SPIE vol. 2998, No. 12, Photonics West 97, San Jose, CA 1997; pp. 1–11.

*Primary Examiner*—Nelson Moskowitz
*Attorney, Agent, or Firm*—Gregory J. Murgia

[57] ABSTRACT

A loss-less, optical add/drop multiplexer according to the present invention includes a rare earth-doped fiber amplifier integrated with a wavelength-selective fiber path coupled between two directional optical transfer devices for selectively adding and dropping optical signals from a multi-wavelength signal, such as a wavelength division multiplexed optical signal. One or more fiber gratings are disposed along the length of the rare earth-doped fiber amplifier or between segments of the rare earth-doped fiber so that at least one grating is used for reflecting each optical signal that is expected to be added to or dropped from the multi-wavelength optical signal. By using this configuration, appropriate amplification is provided to compensate for losses in the add, drop, and through paths.

43 Claims, 5 Drawing Sheets

WAVELENGTH-SELECTIVE AND LOSS-LESS OPTICAL ADD/DROP MULTIPLEXER

CROSS REFERENCES TO RELATED APPLICATIONS

This application is related to another U.S. patent application, Ser. No. 08/920,390 entitled "Expandable Wavelength-Selective and Loss-Less Optical Add/Drop System", filed concurrently herewith, having a common inventor and assignee.

FIELD OF THE INVENTION

This invention relates generally to optical components for lightwave communications networks, and, more particularly, to an add/drop multiplexer used for removing and inserting individual optical signals of different wavelengths from a multi-wavelength optical signal.

BACKGROUND OF THE INVENTION

Wavelength division multiplexing (WDM) is commonly used in lightwave communications systems to provide increased transmission capacity. As is known to those skilled in the art, the addition of an optical add/drop capability in WDM-based systems provides added flexibility for removing and adding individual channels at intermediate nodes in the WDM transmission path, which further enhances the management of optical transmissions in lightwave communications systems. Although some advances have been made in the development of optical add/drop multiplexers (ADMs), there is still a need for a highly selective, loss-less ADM for use in WDM-based systems.

In general, most prior art ADMs utilize fixed or tunable fiber gratings to provide the necessary wavelength selectivity for the add/drop function. These prior art ADMs, whether of the fixed or tunable type, suffer numerous disadvantages, including: path loss for added, dropped, and "through" wavelengths; high implementation costs; and numerous design limitations.

Some prior art ADMs utilize tunable fiber gratings in conjunction with directional optical transfer devices, such as directional optical couplers with optical isolators, to accomplish wavelength-selective adding and dropping. Generally, these schemes employ fiber gratings that either pass through a desired wavelength or reflect a wavelength that is to be added or dropped. A major disadvantage of this type of ADM is the insertion loss associated with the splitting and/or combining of optical signals. Specifically, this type of ADM fails to effectively compensate for the losses that occur in the add, drop, and through paths.

Other prior art ADM schemes attempt to compensate for losses by utilizing optical circulators and fiber gratings in conjunction with a "complete" optical amplifier, commonly referred to as a "lumped" amplifier. This type of ADM typically includes fiber gratings disposed between a first and second optical circulator with a "lumped" amplifier at the input side of the first circulator. The lumped amplifier at the input side is able to provide gain for the optical signals that are dropped via the first circulator as well as those optical signals that pass through the ADM without being dropped. However, the optical signals that are added via the second circulator do not pass through the lumped amplifier. Consequently, this type of ADM does not effectively compensate for the insertion loss experienced by the optical signals in the add path of the ADM. Similarly, a lumped amplifier placed at the output side of the second circulator cannot effectively compensate for the insertion loss in the drop path because the optical signals reflected by the fiber gratings and dropped via the first circulator do not pass through the lumped amplifier at the output side of the second circulator. In sum, prior art ADMs with lumped optical amplifiers suffer the disadvantages of inefficient amplification, higher implementation costs, and added design complexity as more lumped amplifiers are added within the various output paths of the ADM.

Accordingly, there is a need for an optical add/drop multiplexer that is loss-less and that provides wavelength selective add/drop capability to overcome the shortcomings of the prior art.

SUMMARY OF THE INVENTION

A loss-less, wavelength-selective add/drop multiplexer is achieved according to the principles of the present invention with a configuration that includes optical circulators used in conjunction with wavelength-selective fiber gratings placed between segments of a rare earth-doped fiber amplifier for selectively adding and dropping wavelengths from a multi-wavelength signal, such as a wavelength division multiplexed optical signal. By using this configuration, appropriate amplification is provided to compensate for specific losses in the add, drop, and through paths.

Generally, the add/drop multiplexer of the present invention comprises an appropriate length of rare earth-doped optical fiber coupled between two directional optical transfer devices. One or more fiber gratings are disposed along the length of the rare earth-doped fiber or between segments of the rare earth-doped fiber so that at least one grating is used for each wavelength in the multi-wavelength optical signal that is expected to be added or dropped.

In an illustrative embodiment of the present invention, the add/drop multiplexer is comprised of an erbium-doped optical fiber coupled between a first and second optical circulator. The erbium-doped optical fiber is divided into at least two segments so that fiber gratings, such as Bragg gratings, can be disposed along or between the segments to provide a band reflective filtering function. An optical signal, such as a wavelength division multiplexed (WDM) signal having a plurality of optical carriers of different wavelengths, is provided as input to the first optical circulator. The WDM signal exits the first optical circulator and is amplified by at least one of the erbium-doped optical fiber segments prior to reaching the Bragg gratings. The Bragg gratings are adapted by fabrication, and even tuning, to reflect a subset of optical signals of selected wavelengths back toward the first optical circulator. These reflected signals are then dropped and demultiplexed or split as required. Those optical signals not reflected by the Bragg gratings pass through to a second circulator where other optical signals of selected wavelengths can also be added.

By optically pumping the erbium-doped fiber amplifier with an appropriate pump signal wavelength, the erbium-doped optical fiber acts as a traveling wave amplifier that compensates for losses where they occur, thereby assuring a substantially path equalized signal at each output of the ADM. Consequently, the present invention provides a loss-less, wavelength-selective add/drop capability that overcomes the shortcomings of the prior art optical add/drop multiplexer configurations.

BRIEF DESCRIPTION OF THE DRAWING

A more complete understanding of the present invention may be obtained from-consideration of the following detailed description of the invention in conjunction with the drawing, with like elements referenced with like references, in which.

DETAILED DESCRIPTION OF THE INVENTION

Figure 1:
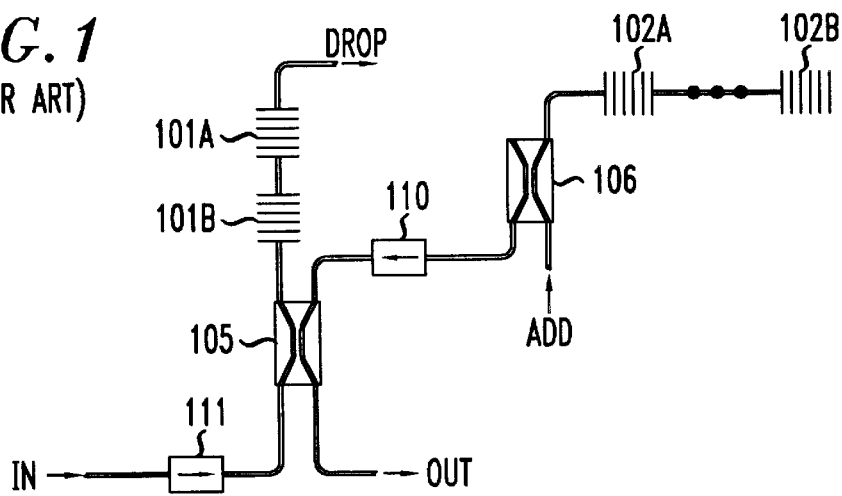
FIG. 1 shows a typical prior art add/drop multiplexer configuration.

A more complete understanding of the present invention can be obtained in view of a brief description of the prior art add/drop multiplexers (ADMs). Accordingly, FIG. 1 shows a typical prior art ADM configuration described in U.S. Pat. No. 5,600,473, issued to Huber, entitled Optical Amplifier Systems with Add/Drop Multiplexing. As shown, fiber gratings 101A, 101B, 102A, and 102B are used in conjunction with directional optical couplers 105, 106 and optical isolators 110, 111 to provide a selective add/drop capability. Fiber gratings 101A and 101B are used to pass those wavelengths that are to be dropped while reflecting the other wavelengths. Similarly, fiber gratings 102A and 102B are used to reflect those wavelengths that are to be added while passing the other wavelengths. As previously described, insertion losses can be found in each of the add, drop, and "through" paths of this ADM.

Figure 2:
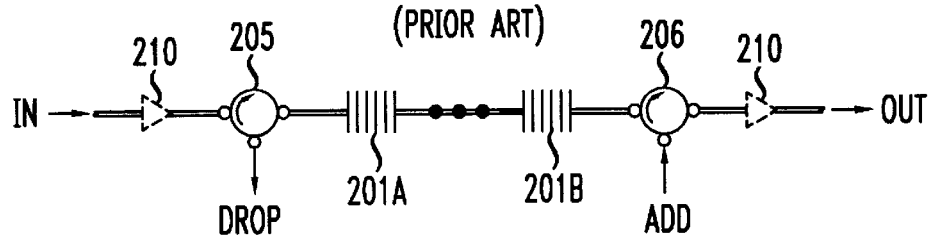
FIG. 2 shows another prior art low-loss add/drop multiplexer configuration.

In an attempt to compensate for these insertion losses, some prior art ADM configurations include a lumped optical amplifier as shown in FIG. 2 and described in an article by Giles et al., *Low-Loss Add/Drop Multiplexers for WDM Lightwave Networks*, IOOC '95, Paper ThC2-1. In this configuration, fiber gratings 201A and 201B are used in conjunction with optical circulators 205 and 206 along with a lumped amplifier 210 placed at the input side or a lumped amplifier 210' at the output side of the ADM. Fiber gratings 201A and 201B are set to reflect those wavelengths to be dropped via circulator 205 as well as those wavelengths to be added via circulator 206. As previously described, placing lumped amplifiers at the input side or output side of an ADM adds considerable design complexity and cost to the system, and, more importantly, does not effectively compensate for all of the insertion losses in the add, drop and "through" paths.

Figure 3:
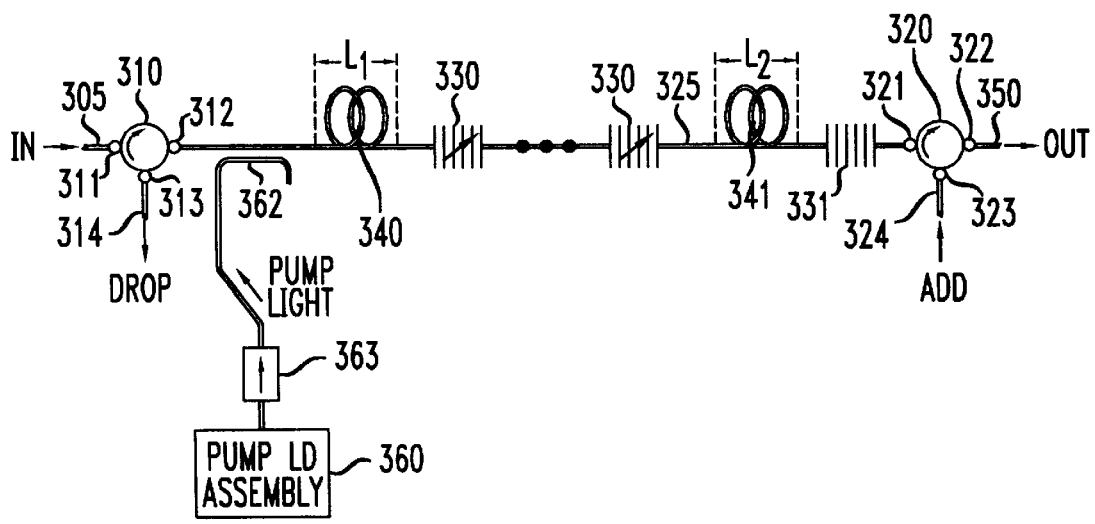
FIG. 3 shows a loss-less optical add/drop multiplexer embodying the principles of the present invention.

Referring to FIG. 3, there is shown an exemplary embodiment of an ADM according to the principles of the present invention that incorporates a rare earth-doped fiber amplifier configuration as an integrated part of the wavelength-selective ADM. One example of an increasingly common type of rare earth-doped fiber amplifier suitable for the present invention is an erbium doped-fiber amplifier (EDFA). Accordingly, because the use of EDFAs and the associated benefits are well known in the art, the present invention will be described with respect to the use of an EDFA. However, it is also contemplated that other suitable rare earth elements may be used, such as praseodymium, neodymium, and the like.

In general, the benefits of the present invention are achieved by judiciously integrating an amplification medium and a wavelength-selective fiber path between two directional optical transfer devices. As shown in FIG. 3, the present invention includes an erbium doped-fiber amplifier (EDFA) comprised of at least two segments of erbium-doped fiber (EDF) 340 and 341, at least one wavelength selective element 330, a pair of directional optical transfer devices 310 and 320, and a pump arrangement that includes a pump source 360, a coupler 362, and an optional pump isolator 363. By way of example only, wavelength selective elements 330 can be implemented with tunable fiber Bragg gratings and directional optical transfer devices 310 and 320 can be implemented with optical circulators. However, other suitable wavelength selective elements and directional optical transfer devices are known in the art and may be used in the present invention to achieve the same results. It should also be noted that although only two EDF segments are shown in the illustrative embodiments, those skilled in the art will understand from the following teachings that multiple EDF segments may be used without departing from the spirit and scope of the present invention.

Input port 311 of optical circulator 310 is coupled to input optical fiber 305 carrying a multi-wavelength optical signal, such as a wavelength division multiplexed (WDM) signal comprised of a given number of channels (i.e., optical carriers) each having a different wavelength. EDF segment 340 is coupled to output port 312 of optical circulator 310. EDF segment 341 is coupled to input port 321 of optical circulator 320, and output optical fiber 350 is coupled to output port 322 of optical circulator 320. Optical circulator 310 includes drop port 313 coupled to optical fiber 314 for carrying those selected optical signals which are to be dropped from the multi-wavelength optical signal. Similarly, optical circulator 320 includes add port 323 coupled to optical fiber 324 for carrying those selected optical signals which are to be added to the multi-wavelength optical signal. Those skilled in the art will recognize that a number of different optical components may be coupled in to drop port 313 and add port 323 depending on the application. Some examples of such optical components, although not shown, include optical multiplexers and demultiplexers, optical splitters, combiners, tunable optical filters, optical transmitters, and the like.

Tunable fiber Bragg gratings 330 are disposed between EDF segments 340 and 341. Each of the fiber Bragg gratings 330 is tuned so that at least one fiber Bragg grating 330 is used for each particular wavelength that is to be added or dropped. Stated otherwise, fiber Bragg gratings 330 are adapted to reflect the particular wavelength in the multi-wavelength optical signal that is to be added or dropped. Methods for adapting fiber Bragg gratings using fabrication techniques or other tuning/programming techniques are well known in the art. These fiber Bragg gratings 330 can be spliced into the fiber path between EDF segments 340 and 341, etched directly on the fiber path between EDF segments 340 and 341, or incorporated by other known methods. For additional background information on the use of fiber Bragg gratings as wavelength selective components, see, for example, Hubner et al., *Strong Bragg Gratings in Non Sensitized Low Loss Planar Waveguides as Building Blocks for WDM Network Components*, SPIE Vol. 2998, No. 12, Photonics West 97, San Jose, Calif., 1997.

In one variation of the embodiment of FIG. 3, the erbium doped-fiber amplifier can be a single active length of erbium-doped fiber (EDF) comprising two contiguous EDF segments. In this configuration, the tunable fiber Bragg gratings are incorporated along the length of the EDF, e.g., directly etched into the EDF.

In order to provide an amplifying effect, the EDF must be "pumped" so that the erbium ions can be excited to a higher, metastable energy state. As the ions at the higher energy state outnumber those at the normal ground state, a population inversion is created which sets the stage for the EDF to become an active amplifying medium. In the present invention, the EDF is illuminated with pump source 360, which can be a semiconductor laser pump assembly, such as a laser diode pump shown in FIG. 3, or any other suitable pump source well known in the art. The luminous energy generated by pump source 360, also referred to as pump light, has a shorter wavelength than any of the wavelengths in the multi-wavelength optical signal (i.e., signal light), and is typically either 980 nm or 1480 nm for an EDFA, depending on the application. Once the erbium ions are excited to the higher metastable state, they will then either spontaneously decay back to the ground state causing spontaneous emission noise, or more significantly, they will be stimulated by an incoming signal photon at any wavelength from the multi-wavelength optical signal thereby emitting coherent photons. Coherent photons, which are photons in the same direction, phase, and wavelength as the incoming signal photon, constitute gain. Stated otherwise, passage of an incoming signal photon from the multi-wavelength optical signal having a wavelength corresponding to that of the excited state causes a decay from the excited state to the ground state, but with an associated stimulated emission that amplifies the incoming signal.

Referring again to FIG. 3, a forward pumping configuration is shown in which the pump light is generated by pump source 360 in the same direction as the signal light from the multi-wavelength optical signal. In this forward pumping configuration, or co-propagating pumped configuration, pump source 360 is coupled between output port 312 of optical circulator 310 and EDF segment 340 via wavelength selective coupler 362. Additionally, an optional pump isolator 363 may be coupled at the output of pump source 360 to protect against the return of the pump signal via backscattering or reflections which could damage the laser. For additional background on this pumping arrangement, as well as other pumping arrangements which will be described below in more detail, see U.S. Pat. No. 5,218,608, Optical fiber Amplifier, issued to Aoki and herein incorporated by reference.

An additional fiber Bragg grating 331, referred hereinafter as pump reflector fiber grating 331, can also be incorporated within the fiber path to fully utilize the pump power generated by pump source 360. In particular, this pump reflector fiber grating 331, which is coupled between EDF segment 341 and input port 321 of optical circulator 320, is adapted (e.g., tuned) to reflect the pump signal from pump source 360. With this arrangement, the unused pump signal is reflected back through EDF segments 341 and 340, respectively, thus improving amplification efficiency.

In another variation of the embodiment shown in FIG. 3, supervisory channels and/or maintenance channels can be added or dropped from the multi-wavelength optical signal as required. Specifically, additional fiber Bragg gratings (not shown) could be inserted between EDF segments 340 and 341 to reflect wavelengths corresponding to the supervisory channels and/or maintenance channels. Alternatively, for supervisory and/or maintenance channels having wavelengths outside of the EDFA spectrum, the additional fiber gratings (not shown) could be placed between optical circulator 310 and EDF segment 340 for dropping or between EDF segment 341 and optical circulator 320 for adding. With these added gratings, supervisory and/or maintenance channels could then be dropped via drop port 313 of optical circulator 310 to preclude unnecessary amplification of these channels across "through" path 325, that is, the path between optical circulators 310 and 320. Similarly, supervisory and/or maintenance channels could be added back into the multi-wavelength optical signal via add port 323 of optical circulator 320 for transmission to the next network element in the lightwave system.

The most important benefits of this unique ADM configuration, as presently understood, can be appreciated in light of a description of the operation of the ADM as shown in FIG. 3. In operation, a multi-wavelength optical signal ("input signal") comprising optical signals having wavelengths $\lambda_1$ through $\lambda_n$ is transmitted through input optical fiber 305 and enters input port 311 of optical circulator 310. Pump source 360 supplies a pump signal to place the EDFA, comprising EDF segments 340 and 341, in an amplifying state. Optical circulator 310 circulates the input signal to output port 312 where the input signal is then amplified by EDF segment 340. Fiber Bragg grating or gratings 330 reflect the particular optical signals to be dropped. In FIG. 3, these optical signals to be dropped have wavelengths represented as $\lambda_r$ (where $\lambda_r = \{\lambda_1, \ldots, \lambda_k\}$, $1 \leq k \leq n$) with $\lambda_r$ being a subset of all wavelengths $\lambda_1$ through $\lambda_n$ in the input signal. As the amplified input signal reaches fiber Bragg grating or gratings 330, optical signals $\lambda_r$ to be dropped are reflected back through EDF segment 340 and back into output port 312 of optical circulator 310. These reflected optical signals are then circulated to drop port 313 where they are then dropped via optical fiber 314. As previously described, various types of known optical components may be used to manipulate the dropped optical signals accordingly. It should be noted that the dropped optical signals $\lambda_r$ are sufficiently amplified by the return trip through EDF segment 340 in order to compensate for any insertion losses that occur within the drop path. Accordingly, it can be seen that the gain of any dropped optical signals is determined by $2 \times L_1$, where $L_1$ is the length of EDF segment 340, since the dropped optical signals pass through EDF segment 340 twice.

Those optical signals not reflected by fiber Bragg grating or gratings 330 continue on "through path" 325 to EDF segment 341 where they are amplified again. As such, the gain of the "through" traffic is determined by $L_1 + L_2$ since the "through" signals pass through each EDF segment once. These "through" signals are then input to optical circulator 320 via input port 321. Optical signals to be added are inserted by the appropriate optical components, such as optical transmitters, coupled to optical fiber 324. These optical signals to be added enter optical circulator 320 via add port 323 and are circulated to exit from input port 321. These optical signals then pass through and are amplified by EDF segment 341. Fiber Bragg grating or gratings 330 reflect the optical signals to be added back through EDF segment 341 and back into input port 321 of optical circulator 320. Optical circulator 320 outputs the "through" optical signals along with the added optical signals via output port 322 on output optical fiber 350. The gain of the "added" optical signals is determined by $2 \times L_2$, where $L_2$ is the length of EDF segment 341, since the added optical signals pass through EDF segment 341 twice.

As is evident by the above description, lengths $L_1$ and $L_2$ of EDF segments 340 and 341, respectively, can be sized accordingly to compensate for any insertion losses that occur within the drop, add, and "through" paths. Specifically, EDF segment 340 having length $L_1$ provides gain for losses occurring in the drop path and "through" path, while EDF segment 341 having length $L_2$ provides gain for losses occurring in the add path and "through" path. Moreover, the present invention is customizable in that the amount of gain needed for loss compensation in each of the paths can be adjusted by selecting appropriate lengths $L_1$ and $L_2$ for EDF segments 340 and 341 and by selecting an appropriate power level for the pump signal. For example, in one practical design implementation for short-reach optical networks such as metropolitan area rings, lengths $L_1$ and $L_2$ and the pump power could be selected accordingly to compensate for the losses associated with the higher of one of the following:

i) losses in the "through" path, which, for short-reach paths, include losses occurring in the transmission fiber between network nodes. These losses are typically in the range of 5 db to 12 db for short-reach optical networks;

ii) losses associated with dropping optical signals. The sensitivity of the optical receivers and technology used for signal splitting/demultiplexing must also be considered in determining these losses. If passive splitting is used, e.g., 3 db couplers, losses for a 16-wavelength system can be about 12 db to 15 db; and iii) losses associated with adding optical signals. The power of optical transmitters used for the local add channels and technology adopted for signal combining/multiplexing must also be considered in determining these losses. Again, if passive combining is used, e.g., 3 db couplers, losses for a 16-wavelength system can be about 12 db to 15 db.

Consequently, the unique design of the present invention, that is, a segmented EDFA integrated with wavelength selective fiber gratings, provides an add/drop multiplexer that does not add any loss to the optical signal being processed. More specifically, the present invention can be designed to compensate for all losses normally associated with the adding, dropping, and "expressing" (i.e., passing through) of wavelengths in the multi-wavelength optical signal. In fact, the present invention is configurable in that it can be customized for a particular application by altering pump power and/or by selecting an appropriate number and lengths of EDF segments as previously described. With this capability, the present invention can even be designed to provide a net gain to the multi-wavelength optical signal to compensate for losses that occur along the fiber path outside of the physical plant where the ADM network element is located. This use of the ADM is especially beneficial for short-reach and intermediate-reach optical network applications, such as metropolitan area rings, where fiber losses are generally less than those found in long haul networks.

It should also be noted that the EDFA configuration of the present invention functions as a single-stage amplifier even though multiple EDF segments are used. In particular, the multiple segments are pumped as a single amplifier with one segment being pumped directly while the other segment is pumped by excess pump power through the one segment. Therefore, the ADM embodying the principles of the invention uses a single gain element in conjunction with a pump source, wavelength selective elements, and optical transfer devices for amplifying the optical signals in the add, drop, and through paths of the ADM. Moreover, by integrating the amplification function of the EDFA with wavelength-selective adding/dropping via fiber gratings, a totally wavelength-selective and loss-less add/drop capability is provided at a lower cost without adding unnecessary design complexity.

Figure 4:
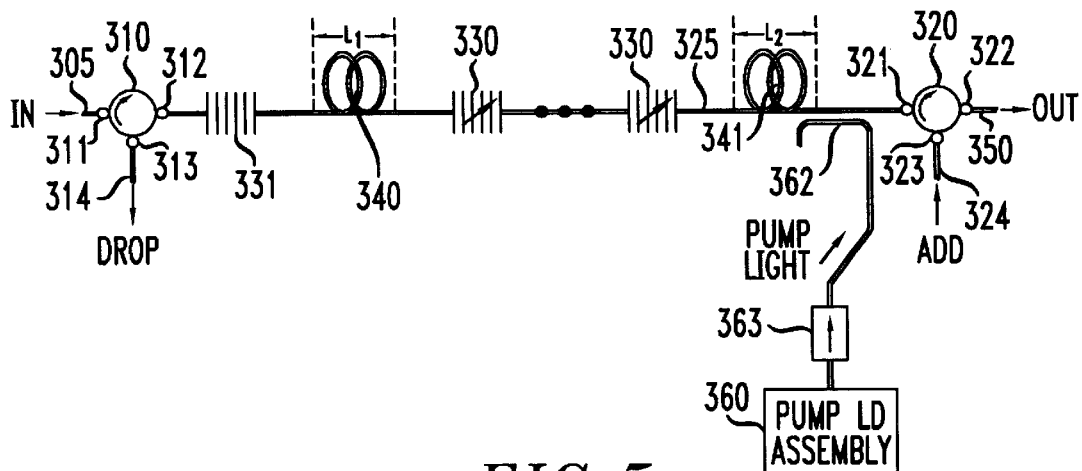
FIGS. 4 through 8 show variations on the pump source implementation in the basic embodiment of the optical add/drop multiplexer shown in FIG. 3.

FIGS. 4 through 8 show variations on the pump source implementation in the basic embodiment of the optical add/drop multiplexer shown in FIG. 3. In each of these variations, it should be noted that the EDF amplifying medium is always between the two optical circulators 310 and 320. In particular, FIG. 4 shows a backward pumping configuration used to supply the pump signal to the EDFA in the ADM. All other aspects of the ADM shown and described in FIG. 3 apply equally to this embodiment. In this backward pumping configuration shown in FIG. 4, or counter-propagating pumped configuration, the pump signal light is generated by pump source 360 in the opposite direction as the signal light from the multi-wavelength optical input signal. Wavelength selective coupler 362 and optional pump isolator 363 are used in the same manner as that previously described for the corresponding elements in the co-propagating pumped configuration of FIG. 3. In the counter-propagating pumped configuration, pump source 360 is coupled between EDF segment 341 and input port 321 of optical circulator 320. Also, fiber Bragg grating 331, or pump reflector fiber grating 331, may be incorporated within the fiber path to fully utilize the pump power generated by pump source 360 in a similar manner as that previously described for the embodiment shown in FIG. 3. Specifically, this pump reflector fiber grating 331, coupled between output port 312 of optical circulator 310 and EDF segment 340, would reflect the pump signal back through EDF segments 340 and 341, respectively.

Figure 5:
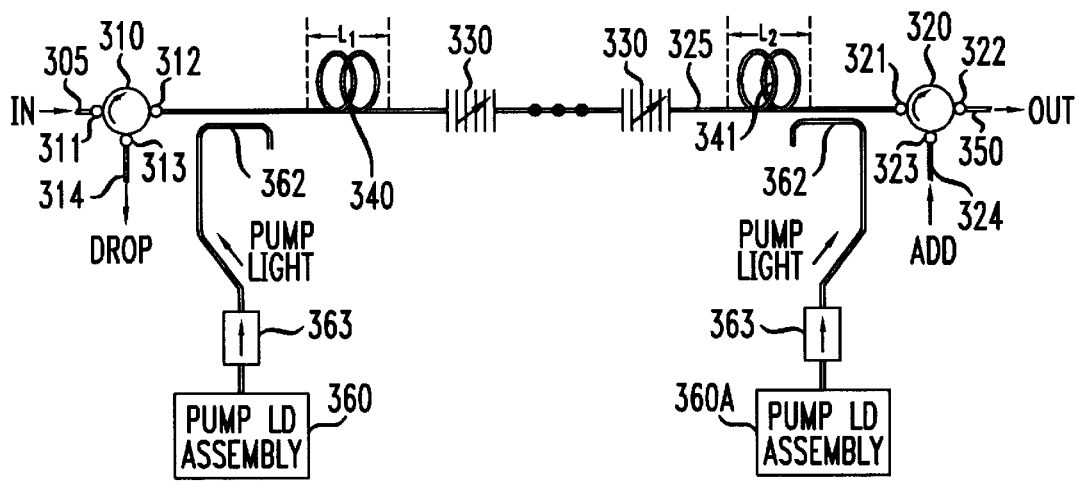

FIG. 5 shows another variation of the pumping configuration that combines the principles of the forward and backward pumping configurations of FIGS. 3 and 4, respectively. Specifically, FIG. 5 shows a bi-directional pumping configuration that is used to provide the pump signal to the EDFA in the ADM. Again, all other aspects of the ADM as shown and described in FIG. 3 apply equally to this particular embodiment. In this bi-directional pumping configuration shown in FIG. 5, a pump signal is generated by pump source 360 in a forward direction that is coherent with the signal light of the multi-wavelength optical signal, and also by pump source 360A in a direction opposite to the signal light from the multi-wavelength optical signal. Wavelength selective couplers 362 and optional pump isolators 363 are used here in the same manner as that previously described for the corresponding elements in the pumped configurations of FIGS. 3 and 4. One significant difference in the pump configuration of FIG. 5 is that a pump reflector fiber grating is not used. It will be apparent to those skilled in the art that a pump reflector in this configuration would prevent the pump signal from entering the EDFA.

Figure 6:
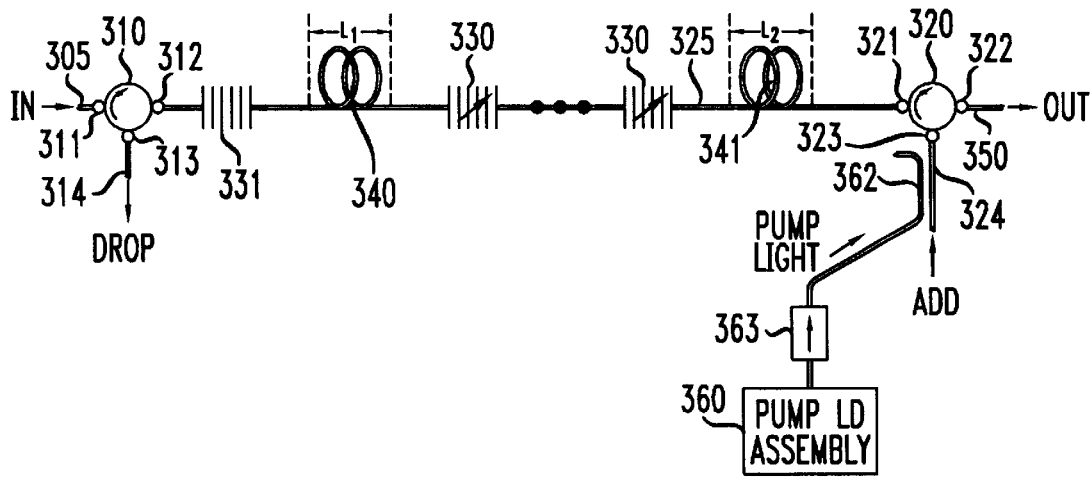
Figure 7:
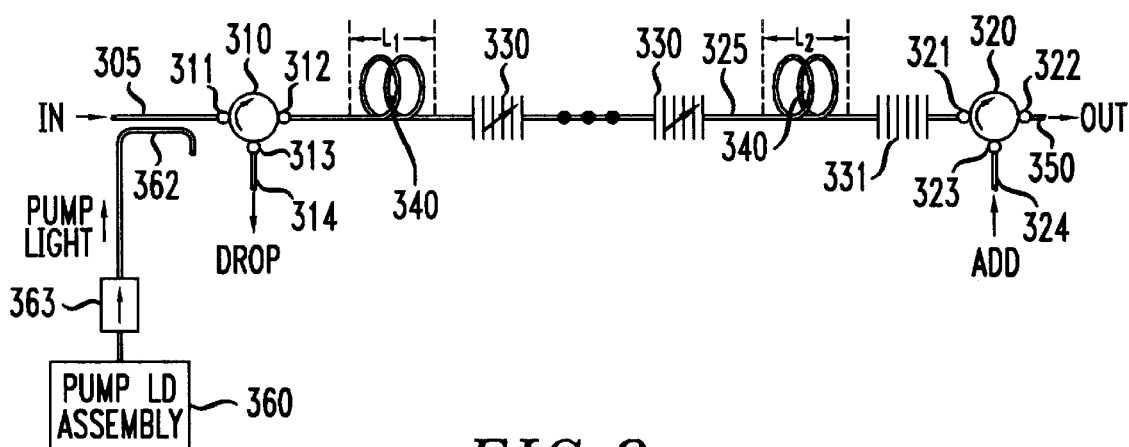
Figure 8:
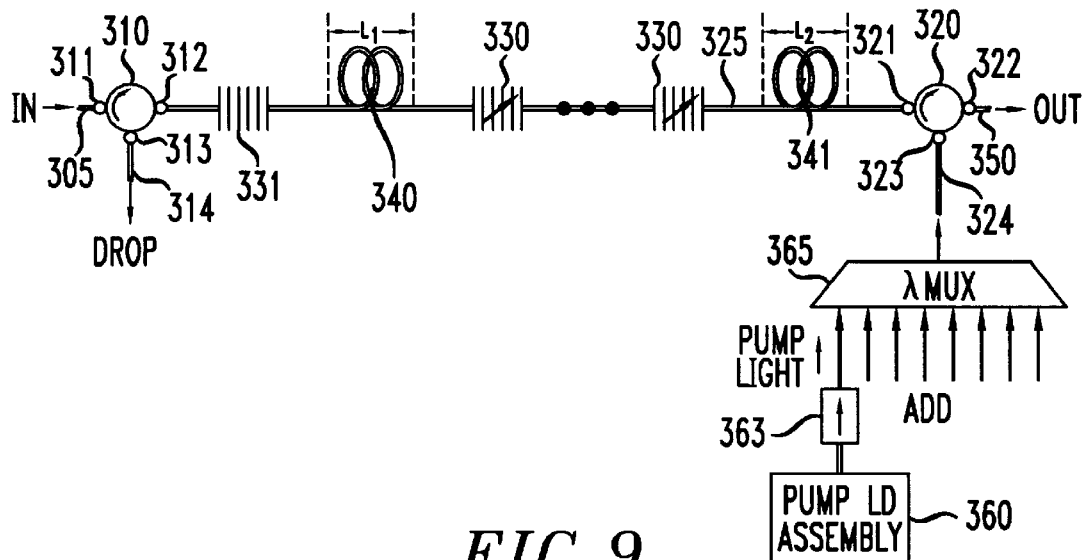

FIGS. 6 through 8 illustrate further embodiments of the present invention utilizing variations of the pumped configurations shown in FIGS. 3 and 4. More specifically, FIG. 6 shows an ADM according to the present invention with the EDFA being pumped by a pump signal through optical circulator 320. In this configuration, pump source 360, optional pump isolator 363, and wavelength selective coupler 362 provide the same function as that previously described in the preceding embodiments. However, wavelength selective coupler 362 couples the pump signal from pump source 360 to add port 323 of optical circulator 320. In operation, the pump signal is circulated clockwise by optical circulator 320 so that the pump signal is transmitted out from input port 321 and through EDF segments 341 and 340, respectively. It should be noted that this configuration requires the pump signal wavelength to be within the bandwidth of optical circulator 320.

FIG. 7 shows another variation of the pump configuration with pump source 360 coupled on the input side of the ADM via input port 311 of optical circulator 310. The principles of operation are similar to those previously described for the co-propagating pump configuration in FIG. 3, except that the pump signal wavelength must be within the bandwidth of optical circulator 310. All other features shown in FIG. 7 are the same as those described in the previous embodiments.

FIG. 8 shows a variation of the pump configuration of FIGS. 4 and 6. Specifically, the pump signal from pump source 360 is combined with other optical signals to be added via an optical component such as an optical multiplexer unit 365. Again, the pump signal wavelength must be within the bandwidth of optical circulator 320. In FIGS. 6 through 8, a pump reflector fiber grating 331 may be incorporated within the fiber path to fully utilize the pump power generated by pump source 360 in a similar manner as that previously described for the embodiments shown in FIGS. 3 and 4.

In certain applications, such as cable television (CATV) broadcast systems or certain types of ring architecture-based systems, the need exists to drop a copy of one or more optical signals while routing another copy as "express." Typically, a drop and continue is performed by splitting the signal using a conventional 3 db splitting device, for example, and routing the split signals to a drop output port and to an express output port. However, the splitting will suffer a 3 db insertion loss associated with the split of optical power plus any excess loss resulting from the splitting device not being a perfect device. Additionally, there are costs associated with adding 3 db splitting devices. The present invention is particularly well-suited for a drop and continue application in that no additional components are required and the losses can be adequately compensated for by the amplifying segments of the EDFA.

Figure 9:
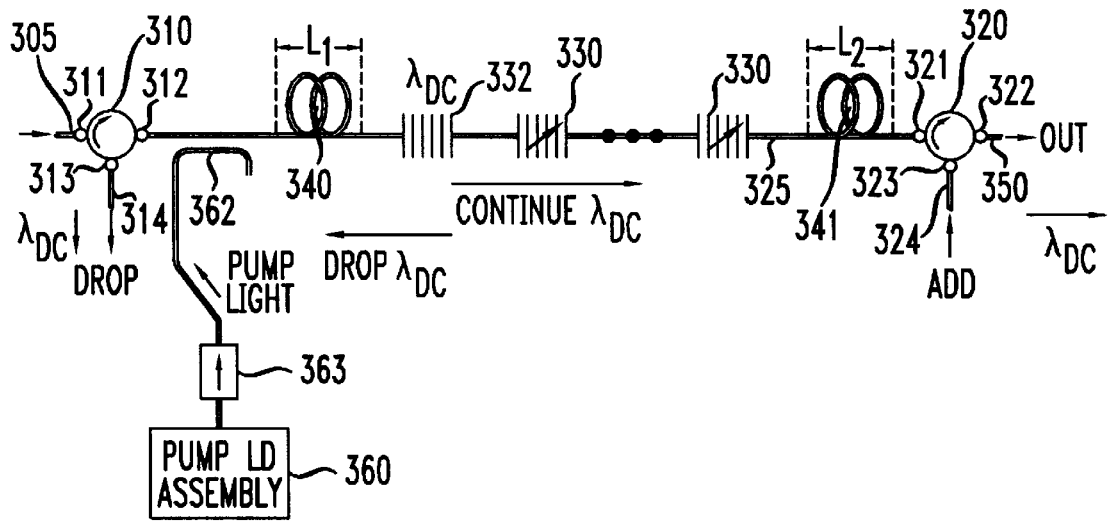
FIG. 9 shows an optical add/drop multiplexer configured to provide "drop and continue" service according to the principles of the present invention.

FIG. 9 shows a drop and continue application using the co-propagating pumped ADM configuration of FIG. 3. However, the embodiment shown in FIG. 9 and described herein is intended to be illustrative only and other modifications are contemplated without departing from the spirit and scope of the present invention. For example, the drop and continue function can be implemented in an equally effective manner using any of the previously described embodiments. Moreover, other modifications will be apparent to those skilled in the art in view of the teachings of the present invention.

Referring to FIG. 9, a partially reflecting fiber grating 332 is adapted to partially reflect the optical signal to be dropped and continued, represented as $\lambda_{dc}$. More specifically, the partially reflecting fiber grating 332 is coupled between EDF segments 340 and 341 along with the other fiber Bragg gratings 330 that are used for the normal drop/add function. Known techniques can be used to provide partially reflecting fiber grating 332. For example, if the fiber gratings are generated by acoustic waves, then partially reflecting fiber grating 332 can be generated with reduced amplitude acoustic waves. If permanent fiber gratings are used, then a grating with low index variation could be used. Other techniques for providing the partially reflecting fiber grating 332 will also be obvious to those skilled in the art.

In operation, optical signal having wavelength $\lambda_{dc}$ is amplified by EDF segment 340, along with the other wavelengths in the multi-wavelength optical signal, and partially reflected off of fiber grating 332. Because of partial reflection, optical signal $\lambda_{dc}$ is both reflected back from fiber grating 332 and also passed through fiber grating 332, with both signals having reduced power as compared to the signal power before the partial reflection. The reflected optical signal $\lambda_{dc}$ is then amplified again by EDF segment 340 so that optical signal $\lambda_{dc}$ can be dropped via drop port 313 of optical circulator 3 10 with sufficient power. The optical signal $\lambda_{dc}$ that continues through fiber grating 332 is amplified again by EDF segment 341 so that the "continued" optical signal $\lambda_{dc}$ has sufficient power for transmission with the remaining wavelengths.

Because of the nature of fiber amplifiers, known gain flattening or gain equalization techniques could also be beneficially used in each of the previously described embodiments. Specifically, and as is known to those skilled in the art, fiber amplifiers such as EDFAs have non-uniform gain profiles, that is, gain is not uniform over the wavelength range of the EDFA. Consequently, prior art gain flattening and gain equalization methods and techniques should be used in conjunction with the present invention. These techniques are used to provide wavelength selective signal attenuation in the spectrum of greatest gain to level out, or equalize, the overall amplifier gain spectrum. By way of example only, one effective gain equalization method is to use fiber Bragg gratings to interact with the light wave as a wavelength selective filter. The filter function can be tailored to be the inverse of the wavelength-dependent amplifier gain by adjusting the spacing of the gratings. In the present invention, these gain-flattening fiber gratings can be included along with the tunable fiber gratings 330 in any of the embodiments shown and described herein. For additional background on the use of fiber Bragg gratings for gain flattening and gain equalization, see Bergano et al., *Long Period Fiber-Grating-Based Gain Equalizers*, Optics Letters, Vol. 21, No. 5, Mar. 1, 1996.

Figure 10:
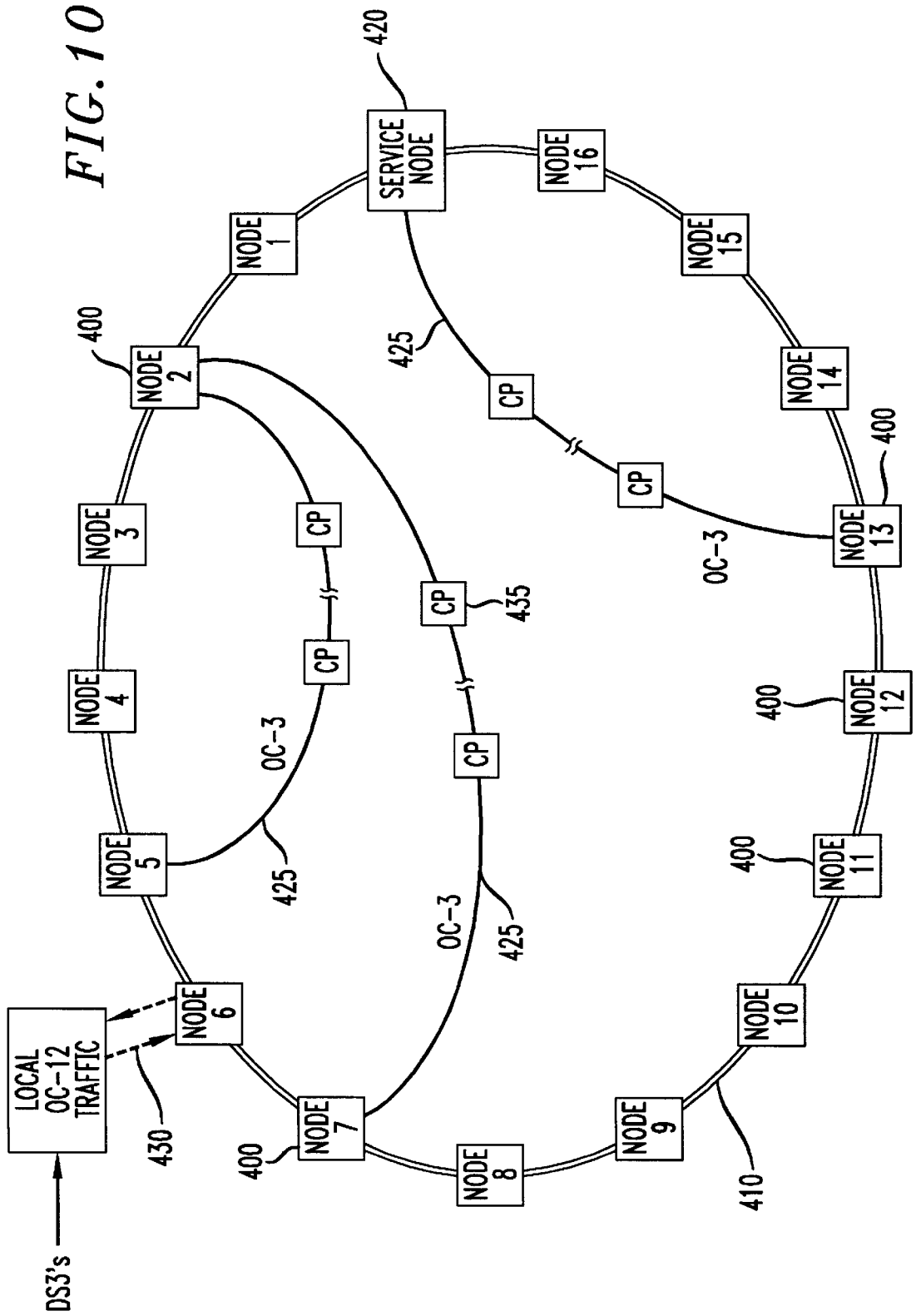
FIG. 10 shows a metropolitan area network architecture utilizing an optical add/drop multiplexer according to the principles of the present invention.
Figure 11:
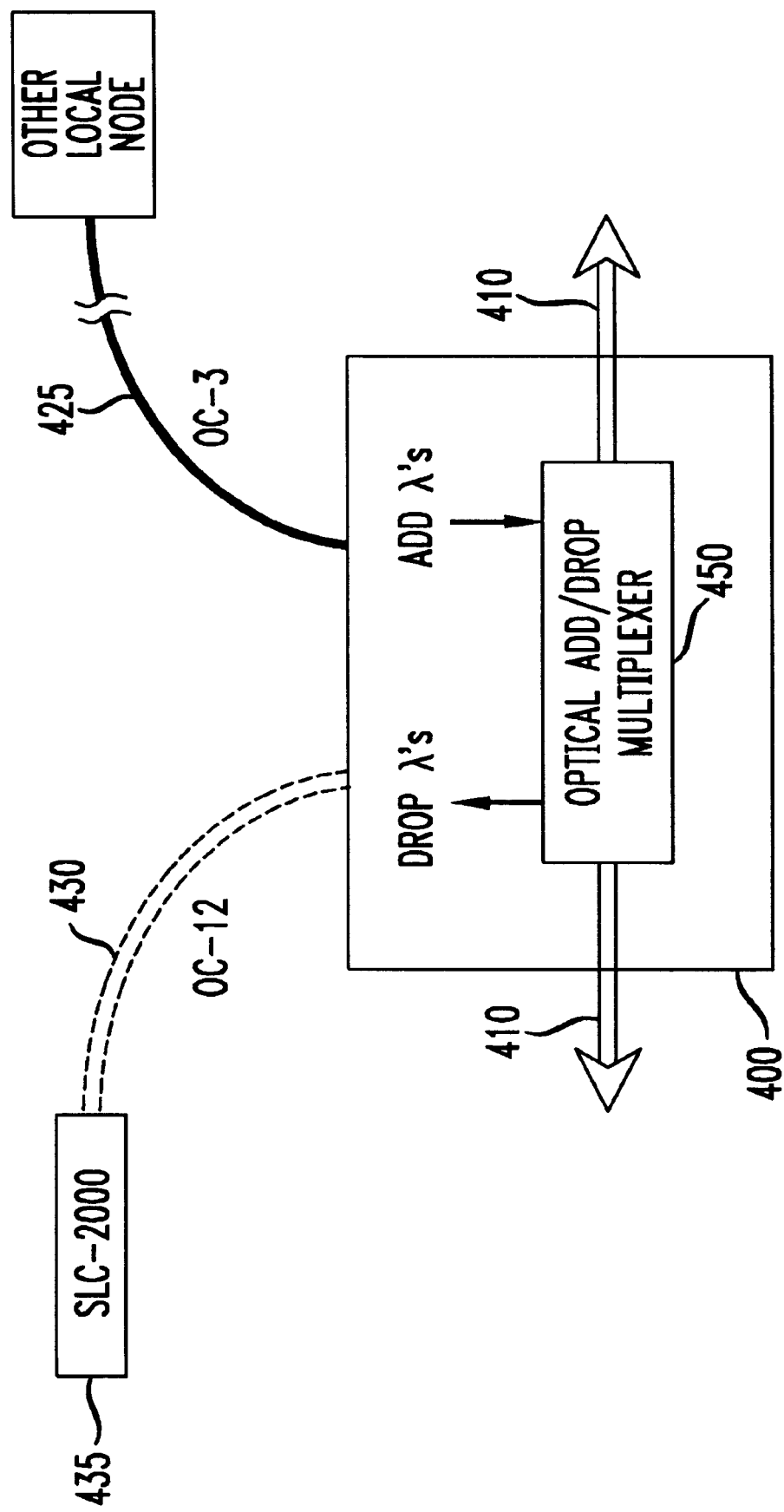
FIG. 11 shows a particular network element within the metropolitan area network using the add/drop multiplexer of the present invention.

FIGS. 10 and 11 show how the present invention can be used in a dense wavelength division multiplexed (DWDM) optical ring architecture for metropolitan area networks (MANs). The ADM of the present invention is particularly well-suited for MAN ring applications because MANs are typically characterized by a high concentration of add/drop sites within a small geographical region supporting a mix of transport signals. FIG. 10 shows an overall ring architecture for a MAN which typically includes a number of local nodes 400 connected via a backbone ring 410 to a long haul service node 420. Service node 420 is used to provide the necessary routing into a core network or to a switch (not shown). Backbone ring 410 would be a multi-wavelength optical ring having a number of wavelengths, e.g., a 16-wavelength system. Local nodes 400 carry all of the loop traffic into service node 420. Additionally, lower capacity distribution rings 425 and 430 are generally multiplexed onto backbone ring 410 at local nodes 400. These lower capacity distribution rings 425 and 430 are used to add and drop traffic at a number of customer premises nodes which are typically serviced by customer premises equipment 435 such as the SLC®-2000 Access System or DDM-2000 FiberReach Multiplexer, both of which are manufactured by Lucent Technologies, Inc. Distribution rings 425 and 430 are typically OC-3 (155 Mbps) or OC-12 (622 Mbps) rings. Distribution rings 425 which extend between two different local nodes 400 are often referred to as arcs, while distribution rings 430 which begin and end with the same local node 400 are referred to as loops.

The ADM of the present invention would be particularly useful at local nodes 400 (FIG. 10) because of the selective add/drop capability. More specifically, FIG. 11 shows one particular implementation of local node 400 in which ADM 450 of the present invention is coupled to the multi-wavelength, high capacity backbone ring 410. In this example, two lower capacity distribution rings are multiplexed onto the high capacity backbone ring 410, those being an OC-3 arc 425 from another local node and a DDM-2000 loop 430 containing OC-12 traffic from a customer premises equipment 435. Using ADM 450, optical signals can be selectively added and/or dropped from both the OC-3 and OC-12 distribution rings at local node 400 according to the principles of the present invention as previously described in detail. Use of DWDM in conjunction with the ADMs of the present invention also eliminates the need for synchronization/clock circuits because the various wavelength components do not need to be synchronized with respect to each other. Although a MAN application has been specifically described herein, there are numerous other optical networking applications that would also be well-served by the ADM according to the principles of the present invention.

It will be understood that the particular embodiments described above are only illustrative of the principles of the present invention, and that various modifications could be made by those skilled in the art without departing from the spirit and scope of the present invention. Accordingly, the scope of the present invention is limited only by the claims that follow.

What is claimed is:

1. An optical add/drop network element including
   an input port for receiving a multi-wavelength optical signal having individual optical signals of different wavelengths,
   an output port for passing said multi-wavelength optical signal from the optical add/drop network element, and
   first, second, and third optical transmission paths, wherein
      said first optical transmission path is a drop path for carrying at least one of said individual optical signals dropped from said multi-wavelength optical signal, said drop path optically communicating with said input port,
      said second optical transmission path is an add path for carrying at least one optical signal of a particular wavelength to be added to said multi-wavelength optical signal, said add path optically communicating with said output port, and
      said third optical transmission path is a through path, coupled between said input port and said output port, for carrying said multi-wavelength signal,
   wherein a common portion is defined by portions of each of said add, drop and through paths such that said common portion is capable of being used for adding and dropping individual optical signals and for carrying said multi-wavelength signal,
   said common portion including a wavelength-selective apparatus with integrated amplification for use in the add/drop network element, the apparatus comprising:
      at least one wavelength selective element disposed in a wavelength-selective path between said input port and said output port;
      an optically amplifying rare earth-doped fiber section integrated with said wavelength-selective path, said optically amplifying rare earth-doped fiber section including
         a first segment coupled between said input port and said at least one wavelength selective element, and
         a second segment coupled between said at least one wavelength selective element and said output port; and
      a source of pump light coupled to and operable to pump said optically amplifying rare earth-doped fiber section,
      wherein said at least one wavelength selective element is adapted to selectively reflect said at least one individual optical signal to be dropped from said multi-wavelength optical signal across said drop path via said first segment.

2. The optical add/drop network element of claim 1, wherein said at least one wavelength selective element is adapted to selectively reflect said at least one optical signal of a particular wavelength to be added to said multi-wavelength optical signal across said add path via said second segment.

3. The optical add/drop network element of claim 2, wherein the length of said first segment is selected to provide optical amplification gain for said dropped optical signal, wherein the length of said second segment is selected to provide optical amplification gain for said added optical signal, the optical amplification gain for non-reflected optical signals being determined by the combined length of said first and second segments, wherein said optical add/drop network element is selectively configurable to provide loss compensation for said added and dropped optical signals by changing the lengths of said first and second segments and by selectively controlling the power of said pump light source.

4. The optical add/drop network element of claim 2, wherein said at least one wavelength selective element is selectively tunable to reflect any one of said individual optical signals of different wavelengths from said multi-wavelength optical signal.

5. The optical add/drop network element of claim 1, wherein said rare earth-doped optical fiber section comprises erbium-doped optical fiber.

6. The optical add/drop network element of claim 1, wherein said pump light source is coupled to said rare earth-doped optical fiber section in a co-propagating pump configuration, said pump light source being operable to generate said pump light in a same direction as said multi-wavelength optical signal.

7. The optical add/drop network element of claim 1, wherein said pump light source is coupled to said input port in a co-propagating pump configuration, said pump light source being operable to emit pump light having a wavelength within a bandwidth of said input port in a same direction as said multi-wavelength optical signal.

8. The optical add/drop network element of claim 1, wherein said pump light source is coupled to said rare earth-doped fiber section in a counter-propagating pump configuration, said pump light source being operable to generate said pump light in an opposite direction as said multi-wavelength optical signal.

9. The optical add/drop network element of claim 1, wherein said pump light source is coupled to said add path, said pump light source being operable to emit pump light in a same direction as said at least one optical signal of a particular wavelength to be added to said multi wavelength optical signal, and in an opposite direction as said multi-wavelength optical signal.

10. The optical add/drop network element of claim 1, wherein said pump light source is coupled to said rare earth-doped optical fiber section in a hybrid bi-directional pump configuration, said pump light source being operable to emit pump light in both a same direction and an opposite direction as said multi-wavelength optical signal.

11. The optical add/drop network element of claim 1, wherein said at least one wavelength selective element is an in-fiber Bragg grating.

12. The optical add/drop network element of claim 6, further comprising a pump reflector fiber grating coupled within said through path for selectively reflecting said pump light back through said second and first segments, respectively.

13. The optical add/drop network element of claim 8, further comprising a pump reflector fiber grating coupled within said through path for selectively reflecting said pump light back through said first and second segments, respectively.

14. The optical add/drop network element of claim 1, further comprising at least a second wavelength selective element disposed along said through path for reflecting a non-payload optical signal to be added to and removed from said multi-wavelength optical signal.

15. The optical add/drop network element of claim 14, wherein said non-payload optical signal is selected from the group consisting of a supervisory channel and a maintenance channel.

16. The optical add/drop network element of claim 1, further comprising:
at least a second wavelength selective element disposed between said first and second segments for a drop and continue operation;
said at least second wavelength selective element being adapted to partially reflect at least one of said individual optical signals to produce both a partially reflected optical signal and an express optical signal;
said partially reflected optical signal being reflected back across said drop path via said first segment;
said express optical signal continuing along said through path with said multi-wavelength optical signal via said second segment.

17. The optical add/drop network element of claim 3, further comprising at least one gain-flattening fiber grating disposed between said first and second segments, said at least one gain-flattening fiber grating being operable to flatten the optical amplification gain for said non-reflected optical signals.

18. An optical add/drop network element including
an input port for receiving a wavelength division multiplexed (WDM) optical signal having individual optical carriers of different wavelengths,
an output port for passing said WDM optical signal from the optical add/drop network element, and
first, second, and third optical transmission paths, wherein
said first optical transmission path is a drop path for carrying at least one of said individual optical carriers dropped from said WDM optical signal, said drop path optically communicating with said input port,
said second optical transmission path is an add path for carrying at least one optical carrier of a particular wavelength to be added to said WDM optical signal, said add path optically communicating with said output port, and
said third optical transmission path is a through path, coupled between said input port and said output port, for carrying said WDM optical signal,
wherein a common portion is defined by portions of each of said add, drop and through paths such that said common portion is capable of being used for adding and dropping individual optical carriers and for carrying said WDM optical signal,
said common portion including a wavelength-selective apparatus with integrated amplification for use in the add/drop network element, the apparatus comprising:
at least one wavelength selective element disposed in a wavelength-selective path between said input port and said output port;
a rare earth-doped optical fiber section integrated with said wavelength-selective path between said input port and said output port for optically amplifying said WDM optical signal; and
a source of pump light coupled to and operable to pump said rare earth-doped optical fiber section,
wherein said at least one wavelength selective element is adapted to selectively reflect said at least one individual optical carrier to be dropped from said WDM optical signal across said drop path via said first segment, and
wherein said at least one wavelength selective element is further adapted to selectively reflect said at least one optical carrier of a particular wavelength to be added to said WDM optical signal across said add path via said second segment.

19. The optical add/drop network element of claim 18, wherein said rare earth-doped optical fiber section comprises:
a first segment; and
a second segment contiguous with said first segment,
wherein the length of said first segment is selected to provide optical amplification gain for said dropped optical carrier, wherein the length of said second segment is selected to provide optical amplification gain for said added optical carrier, the optical amplification gain for non-reflected optical carriers being determined by the combined length of said first and second segments, and
wherein said optical add/drop network element is selectively configurable to provide loss compensation for said added and dropped optical carriers by changing the lengths of said first and second segments and by selectively controlling the power of said pump light source.

20. The optical add/drop network element of claim 18, wherein said rare earth-doped optical fiber section comprises an erbium-doped optical fiber section.

21. The optical add/drop network element of claim 19, further comprising:
at least a second wavelength selective fiber grating disposed along said rare earth-doped optical fiber section for a drop and continue operation;
said at least second wavelength selective fiber grating being adapted to partially reflect at least one of said plurality of optical carriers in said WDM optical signal to produce both a partially reflected optical carrier and an express optical carrier;
said partially reflected optical carrier being reflected back across said drop path via said first segment;
said express optical carrier continuing along said through path with said WDM optical signal via said second segment.

22. An optical add/drop network element including
a first directional optical transfer device including at least first, second and third ports, said first port being responsive to a multi-wavelength optical signal having a plurality of optical signals of different wavelengths, said third port for passing at least one of said plurality of optical signals to be dropped from said multi-wavelength optical signal, and a second directional optical transfer device including at least first, second and third ports, said second port for passing said multi-wavelength optical signal from the optical add/drop network element, said third port for receiving at least one of said plurality of optical signals to be added to said multi-wavelength optical signal, a wavelength-selective apparatus with integrated amplification for use in the add/drop network element, comprising:

at least one wavelength selective element disposed in a wavelength-selective path between said first and second directional optical transfer devices;

an optically amplifying rare earth-doped fiber section integrated with said wavelength-selective path, said optically amplifying rare earth-doped fiber section including a first segment having a first end coupled to said second port of said first directional optical transfer device and a second end coupled to said at least one wavelength selective element, and a second segment having a first end coupled to said at least one wavelength selective element and a second end coupled to said first port of said second directional optical transfer device; and a source of pump light coupled to and operable to pump said optically amplifying rare earth-doped fiber section, wherein said at least one wavelength selective element is adapted to selectively reflect at least one of said plurality of optical signals back towards said second port of said first directional optical transfer device via said first segment, and wherein said first directional optical transfer device is operable to drop said at least one reflected optical signal from said multi-wavelength optical signal by circulating said at least one reflected optical signal out through said third port.

23. The optical add/drop network element of claim 22, wherein said third port of said second directional optical transfer device is used to add an optical signal having a particular wavelength to said multi-wavelength optical signal, said second directional optical transfer device being operable to circulate said added optical signal out said first port and through said second segment, said at least one wavelength selective element being adapted to selectively reflect said added optical signal back towards said first port of said second directional optical transfer device via said second segment, said second directional optical transfer device being further operable to circulate said added optical signal along with said multi-wavelength optical signal via said second port.

24. The optical add/drop network element of claim 23, wherein the length of said first segment is selected to provide optical amplification gain for said dropped optical signal, wherein the length of said second segment is selected to provide optical amplification gain for said added optical signal, the optical amplification gain for non-reflected optical signals being determined by the combined length of said first and second segments, wherein said optical add/drop multiplexer is selectively configurable to provide loss compensation for said added and dropped optical signals by changing the lengths of said first and second segments and by selectively controlling the power of said pump light source.

25. The optical add/drop network element of claim 23, wherein said at least one wavelength selective element is selectively tunable to reflect any one of said plurality of optical signals of different wavelengths from said multi-wavelength optical signal.

26. The optical add/drop network element of claim 23, wherein said first and second directional optical transfer devices comprise a first and second optical circulator, respectively.

27. The optical add/drop network element of claim 22, wherein said rare earth-doped fiber section comprises erbium-doped optical fiber.

28. The optical add/drop network element of claim 26, wherein said pump light source is coupled between said second port of said first optical circulator and said first end of said first segment in a co-propagating pump configuration, said pump light source being operable to generate said pump light in a same direction as said multi-wavelength optical signal.

29. The optical add/drop network element of claim 26, wherein said pump light source is coupled to said first port of said first optical circulator in a co-propagating pump configuration, said pump light source being operable to emit pump light having a wavelength within a bandwidth of said first optical circulator, said first optical circulator being operable to circulate said pump light in a same direction as said multi-wavelength optical signal via said second port.

30. The optical add/drop network element of claim 26, wherein said pump light source is coupled between said second end of said second segment and said first port of said second optical circulator in a counter-propagating pump configuration, said pump light source being operable to generate said pump light in an opposite direction as said multi-wavelength optical signal.

31. The optical add/drop network element of claim 26, wherein said pump light source is coupled to said third port of said second optical circulator, said pump light source being operable to emit pump light having a wavelength within a bandwidth of said second optical circulator, said second optical circulator being operable to circulate said pump light in an opposite direction as said multi-wavelength optical signal via said first port.

32. The optical add/drop network element of claim 26, wherein said pump light source is arranged in a hybrid bi-directional pump configuration, said pump light source being coupled between said second port of said first optical circulator and said first end of said first segment, and further coupled between said first port of said second optical circulator and said second end of said second segment, said pump light being pumped in both a same direction and an opposite direction as said multi-wavelength optical signal.

33. The optical add/drop network element of claim 22, wherein said at least one wavelength selective element is an in-fiber Bragg grating.

34. The optical add/drop network element of claim 28, further comprising a pump reflector fiber grating coupled between said first port of said second optical circulator and said second end of said second segment for selectively reflecting said pump light back through said second and first segments, respectively.

35. The optical add/drop network element of claim 30, further comprising a pump reflector fiber grating coupled between said second port of said first optical circulator and said first end of said first segment for selectively reflecting said pump light back through said first and second segments, respectively.

36. The optical add/drop network element of claim 26, further comprising at least a second wavelength selective element disposed between said first and second optical circulators for reflecting a non-payload optical signal to be added to and removed from said multi-wavelength optical signal.

37. The optical add/drop network element of claim 36, wherein said non-payload optical signal is selected from the group consisting of a supervisory channel and a maintenance channel.

38. The optical add/drop network element of claim 22, further comprising:
   at least a second wavelength selective element disposed between said second end of said first segment and said first end of said second segment for a drop and continue operation;
   said at least second wavelength selective element being adapted to partially reflect at least one of said plurality of optical signals to produce both a partially reflected optical signal and an express optical signal;
   said partially reflected optical signal being reflected back towards said second port of said first directional optical transfer device via said first segment, said first directional optical transfer device being operable to drop said partially reflected optical signal via said third port;
   said express optical signal continuing along with said multi-wavelength optical signal via said second segment.

39. The optical add/drop network element of claim 24, further comprising at least one gain-flattening fiber grating disposed between said second end of said first segment and said first end of said second segment, said at least one gain-flattening fiber grating being operable to flatten the optical amplification gain for said non-reflected optical signals.

40. An optical add/drop network element including
   a first optical circulator including at least first, second and third ports, said first port being responsive to a wavelength division multiplexed (WDM) optical signal having a plurality of optical carriers of different wavelengths, said third port for passing at least one of said plurality of optical carriers to be dropped from said WDM optical signal, and
   a second optical circulator including at least first, second and third ports, said second port for passing said WDM optical signal from the optical add/drop network element, said third port for receiving at least one of said plurality of optical carriers to be added to said WDM optical signal,
   a wavelength-selective apparatus with integrated amplification for use in the optical add/drop network element, comprising:
      at least one wavelength selective element disposed in a wavelength-selective path between said first and second optical circulators;
      a rare earth-doped optical fiber section integrated with said wavelength-selective path for optically amplifying said WDM optical signal, said at least one wavelength selective element being disposed along said rare earth-doped optical fiber section; and
      a source of pump light coupled to and operable to pump said rare earth-doped optical fiber section,
      wherein said at least one wavelength selective element is adapted to selectively reflect at least one of said plurality of optical carriers back towards said second port of said first optical circulator via said first segment,
      wherein said first optical circulator is operable to drop said at least one reflected optical carrier from said WDM optical signal by circulating said at least one reflected optical carrier out through said third port, and
      wherein said third port of said second optical circulator is used to add an optical carrier having a particular wavelength to said WDM optical signal, said second optical circulator being operable to circulate said added optical carrier out through said first port, said at least one fiber grating being adapted to selectively reflect said added optical carrier back towards said first port of said second optical circulator via said second segment, said second optical circulator being further operable to circulate said added optical carrier along with said WDM optical signal via said second port.

41. The optical add/drop network element of claim 40, wherein said rare earth-doped optical fiber section comprises:
   a first segment; and
   a second segment contiguous with said first segment,
   wherein the length of said first segment is selected to provide optical amplification gain for said dropped optical carrier, wherein the length of said second segment is selected to provide optical amplification gain for said added optical carrier, the optical amplification gain for non-reflected optical carriers being determined by the combined length of said first and second segments, and
   wherein the optical add/drop network element is selectively configurable to provide loss compensation for said added and dropped optical carriers by changing the lengths of said first and second segments and by selectively controlling the power of said pump light source.

42. The optical add/drop network element of claim 40, wherein said rare earth-doped optical fiber section comprises erbium-doped optical fiber.

43. The optical add/drop network element of claim 41, further comprising:
   at least a second wavelength selective fiber grating disposed along said rare earth-doped optical fiber section for a drop and continue operation;
   said at least second wavelength selective fiber grating being adapted to partially reflect at least one of said plurality of optical carriers in said WDM optical signal to produce both a partially reflected optical carrier and an express optical carrier;
   said partially reflected optical carrier being reflected back towards said second port of said first optical circulator via said first segment, said first optical circulator being operable to drop said partially reflected optical carrier via said third port;
   said express optical carrier continuing along with said WDM optical signal via said second segment.

* * * * *